United States Patent
Tsuchiyama et al.

(10) Patent No.: US 6,845,686 B2
(45) Date of Patent: Jan. 25, 2005

(54) CAM FOLLOWER WITH ROLLER

(75) Inventors: Hiroki Tsuchiyama, Iwata (JP); Kouji Kametaka, Iwata (JP); Tadatoshi Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 46 days.

(21) Appl. No.: 10/223,320

(22) Filed: Aug. 20, 2002

(65) Prior Publication Data

US 2003/0037635 A1 Feb. 27, 2003

(30) Foreign Application Priority Data

Aug. 22, 2001 (JP) ........................................ 2001-251103

(51) Int. Cl.$^7$ .............................................. F16H 53/06
(52) U.S. Cl. ........................................ 74/569; 384/625
(58) Field of Search ........................... 74/569; 384/565, 384/569, 625

(56) References Cited

U.S. PATENT DOCUMENTS

| | | | | | |
|---|---|---|---|---|---|
| 4,969,261 | A | * | 11/1990 | Igarashi | 29/888.1 |
| 5,361,648 | A | * | 11/1994 | Murakami et al. | 74/569 |
| 5,375,323 | A | * | 12/1994 | Sata | 29/888.1 |
| 5,553,512 | A | * | 9/1996 | Harimoto | 74/569 |
| 5,606,939 | A | * | 3/1997 | Spath | 123/90.5 |
| 5,611,250 | A | * | 3/1997 | Narai et al. | 74/569 |
| 5,816,207 | A | * | 10/1998 | Kadokawa et al. | 123/90.42 |

FOREIGN PATENT DOCUMENTS

| JP | 05321999 A | * 12/1993 | ............ F16H/25/00 |
|---|---|---|---|
| JP | 7-190072 | 7/1995 | |
| JP | 2581973 | 7/1998 | |
| JP | 2000-161348 | 6/2000 | |

* cited by examiner

*Primary Examiner*—David A. Bucci
*Assistant Examiner*—Timothy McAnulty
(74) *Attorney, Agent, or Firm*—McDermott Will & Emery LLP

(57) ABSTRACT

A cam follower with roller of the present invention includes a cam follower body having a roller supporting portion integrated therein, a roller supporting shaft having both ends fixed to the roller supporting portion and a roller rotatably supported on the roller supporting shaft with a plurality of needle rollers interposed. At least one of the supporting shaft and the needle roller has a nitride layer on the surface thereof, and has a surface hardness of at least HV 650 and an amount of retained austenite of at least 25% by volume and at most 50% by volume. Thus, a cam follower with roller having excellent durability and fatigue life can be obtained.

4 Claims, 5 Drawing Sheets

CAM FOLLOWER WITH ROLLER

BACKGROUND OF THE INVENTION

1. Field of the Invention

The present invention relates to a cam follower with roller, and more particularly, to a cam follower with roller that is incorporated into a valve mechanism of an internal combustion engine of a vehicle.

2. Description of the Background Art

A combustion engine having a variable valve timing mechanism such as a VTEC (Variable Valve Timing & Lift Electronic Control System) is generally known.

In such a combustion engine, a valve mechanism is configured such that two driving locker arms and a connecting locker arm connecting them actuate together when operated at a high speed, whereas the two driving locker arms actuate separately when operated at a low speed.

In each of the driving locker arms and the connecting locker arm, a roller contacting a cam is supported by a needle bearing. Currently, as a material for a shaft supporting the roller, SUJ2 is used in the driving locker arms, whereas carburized steel is used in the connecting locker arm. These materials are used for the following reasons.

At low engine revolutions, a switching pin does not actuate, generating a small load applied on the needle bearing supporting the roller. Thus, an SUJ2 material is used for the driving locker arms.

At high engine revolutions, however, the switching pin actuates so that the shafts of the driving locker arms and the connecting locker arm are connected, generating an excessive load applied on the needle bearing supporting the roller in the connecting locker arm. The bearing must therefore have a large width in order to ensure long life.

Moreover, when the number of revolutions is high, the driving locker arms and the connecting locker arm actuate together by the actuation of the switching pin, which may cause a problem of shaft bending that originates from the side of the inner diameter of the shaft. This is addressed by increasing the width of the bearing and by using a tough carburized material for the supporting shaft of the roller in the connecting locker arm.

It is noted that the SUJ2 material used here is quenched and tempered such that the hardness of a rolling surface of the needle roller is adjusted to HRC 60 to 62.

The roller supported by the locker arms is in direct contact with the cam. In this portion, lubrication easily dies away compared to other engine components, and thus the contact surface of the cam and roller is called a boundary lubrication region. The needle roller supporting the roller is in contact with the shaft basically in a manner of rolling contact. Under the severe circumstances as described above, however, small sliding occurs between the needle roller and the shaft when the cam load varies rapidly. This makes the needle roller bearing have poor lubrication, causing abrasion and the like, resulting in insufficient durability. Furthermore, as the cam load increases, the pressure on the contacting surface of the needle roller and the shaft also increases, shortening fatigue life.

SUMMARY OF THE INVENTION

An object of the present invention is to provide a cam follower with roller having excellent durability and fatigue life.

In a cam follower with roller of the present invention including a cam follower body having a roller supporting portion integrated into the cam follower body, a supporting shaft having both ends fixed to the roller supporting portion, and a roller rotatably supported on the supporting shaft with a plurality of needle rollers interposed, at least one of the supporting shaft and needle roller has a surface on which a nitride layer is formed, and has a surface hardness of at least HV 650 and an amount of retained austenite of at least 25% by volume and at most 50% by volume.

According to the cam follower with roller of the present invention, a process that involves nitriding is performed to increase the surface hardness to at most HV 650, and to increase the amount of retained austenite to at least 25% by volume and at most 50% by volume. This can reduce abrasion occurring between the supporting shaft and the needle roller and can improve fatigue strength, exhibiting excellent durability and rolling fatigue life.

Further, the process that involves nitriding is performed, so that a nitride layer is formed on the surface of one of the supporting shaft and needle roller.

It is noted that no improvement can be seen in the rolling fatigue life of the cam follower if the amount of retained austenite is less than 25% by volume. Further, if the amount of retained austenite is greater than 50% by volume, the surface hardness is lowered, deteriorating abrasion resistance. Thus, the amount of retained austenite must be at least 25% by volume and at most 50% by volume.

In addition, if the surface hardness is smaller than 25% by volume, the supporting shaft is deformed due to abrasion occurring at rolling of the needle roller. Thus, the surface hardness must be at least HV 650.

Preferably, the cam follower with roller has a supporting shaft made of carburized steel and is subjected to carbonitriding followed by tempering.

When the supporting shaft of the cam follower with roller is used in a high temperature range as in the present invention, it is tempered at an environmental temperature or higher in order to stabilize its dimension in the environment.

In the cam follower with roller, both ends of the supporting shaft are preferably caulked and fixed to the roller supporting portion.

The caulking and fixing work can be performed merely by notching an end surface of the supporting shaft, which prevents an impact on the roller supporting portion. The cam follower therefore would not be deformed at assembling.

In the cam follower with roller, both end surfaces of the supporting shaft preferably have a surface hardness of at least HV 200 and at most HV 280 by no-quenching.

Thus, the end surfaces of the supporting shaft can be notched so as to expand the edges thereof when the cam follower is assembled. Such a process of caulking and fixing would cause no cracks at the end portion, allowing the supporting shaft to be readily and firmly fixed to the cam follower body.

Preferably, the cam follower with roller has a supporting shaft made of bearing steel and is subjected to carbonitriding followed by tempering.

When the supporting shaft of the cam follower with roller is used in a high temperature range as in the present invention, it is tempered at an environmental temperature or higher in order to stabilize its dimension in the environment.

In the cam follower with roller, the supporting shaft is formed by a hollow shaft and is fixed to the roller supporting portion.

Because the supporting shaft is a hollow shaft, a variable valve timing mechanism such as VTEC may be implemented with a simple structure by arranging a switching pin at the hollow portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below with reference to the drawings.

Figure 1:
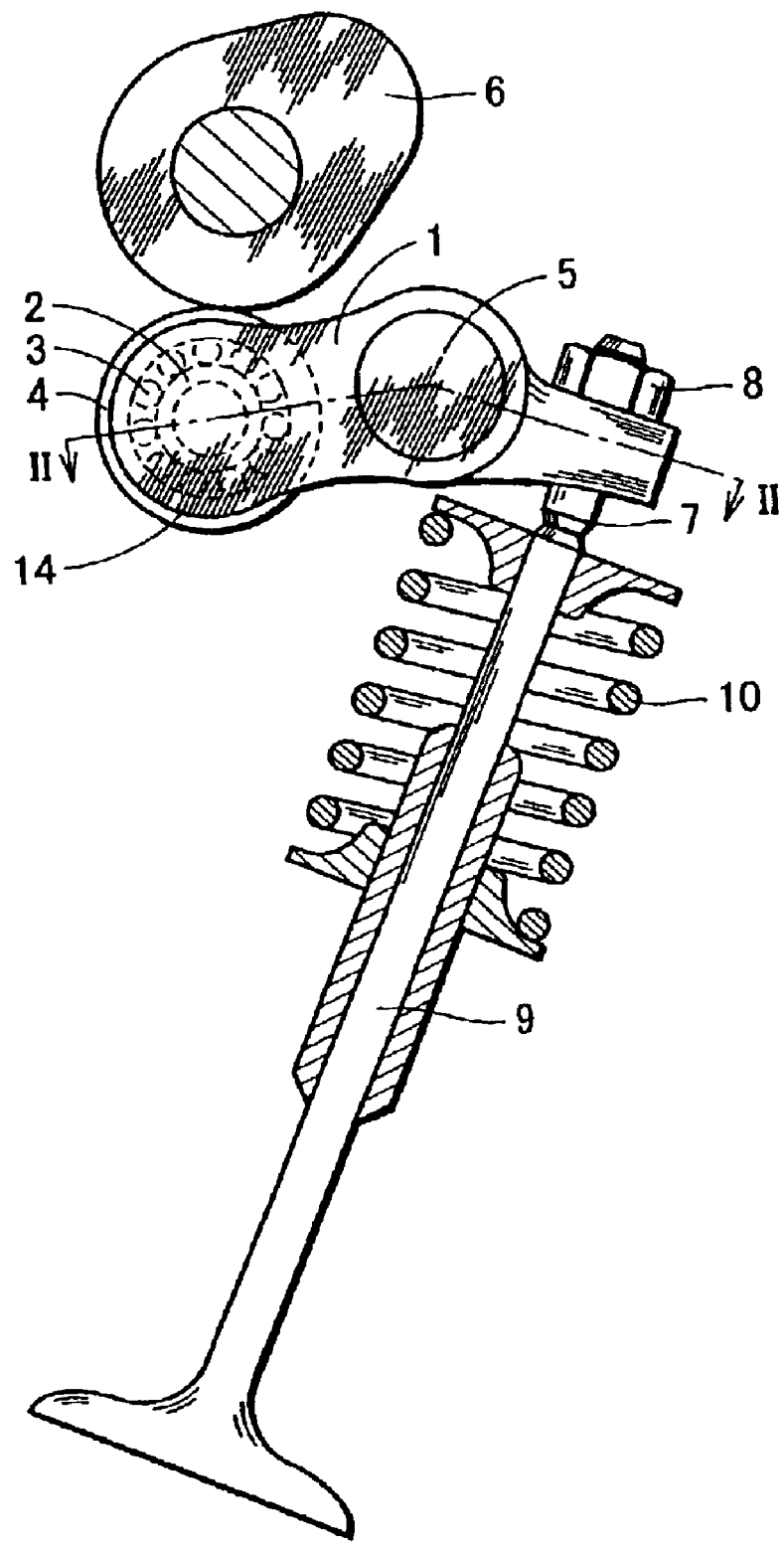
FIG. 1 is a schematic front view showing a structure of a cam follower with roller according to one embodiment of the present invention.
Figure 2:
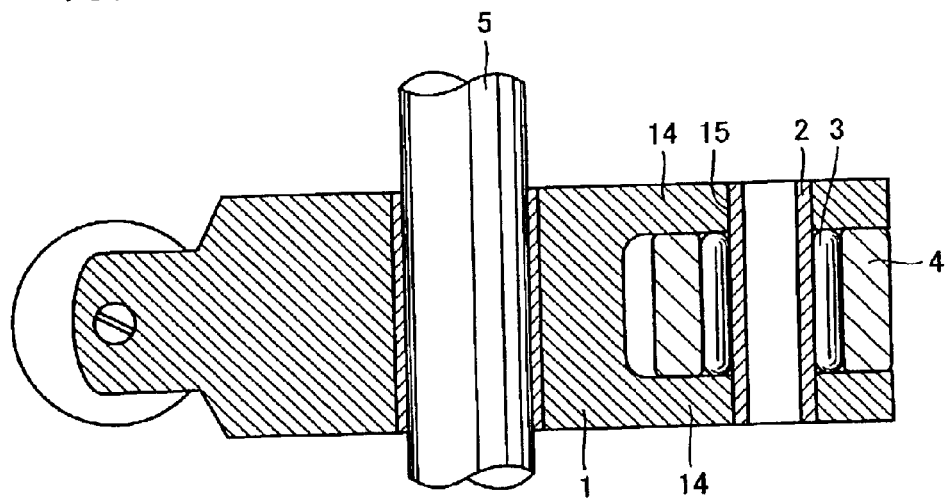
FIG. 2 is a schematic section view taken along the II—II line in FIG. 1.

Referring to FIGS. 1 and 2, a cam follower body 1 is rotatably supported on a cam follower shaft 5 with a bearing metal or the like interposed at a middle portion.

An adjust screw 7 is screwed into one end of cam follower body 1. Adjust screw 7 is fixed by a lock nut 8, and has its lower end being in contact with an upper end of a protruded rod 9 of a suction valve or an exhaust valve of an internal combustion engine. Protruded rod 9 is biased by resilience of a spring 10.

Cam follower body 1 has a roller supporting portion 14 integrally formed in a bifurcated manner at the other end thereof. Both ends of a roller shaft 2 are fixed to the bifurcated roller supporting portion 14 by press-fitting or by a snap ring. A roller 4 is rotatably supported on a middle portion of an outer circumferential surface of roller shaft 2 with a needle roller 3 interposed. The outer circumferential surface of roller 4 is pressed against a cam surface of cam 6 by biasing force of spring 10.

At least one of roller shaft 2 and needle roller 3 is subjected to a process that involves nitriding, thereby having a nitride layer on its surface, with a surface hardness of at least HV 650 and an amount of retained austenite at a superficial portion of at least 25% by volume and at most 50% by volume.

Further, roller shaft 2 is made of bearing steel and is subjected to carbonitriding followed by tempering. Roller shaft 2 is formed by e.g. a hollow shaft and is configured such that a switching pin may be arranged in a hollow portion.

By employing such a structure, rotation of cam 6 allows cam follower body 1 to rotate having cam follower shaft 5 as the center, with roller 4 interposed, to open and close a suction valve or an exhaust valve attached to a tip end of protruded rod 9.

Subsequently, the structure of the cam follower with roller shown in FIGS. 1 and 2 when used in a VTEC valve mechanism will be described.

Figure 3:
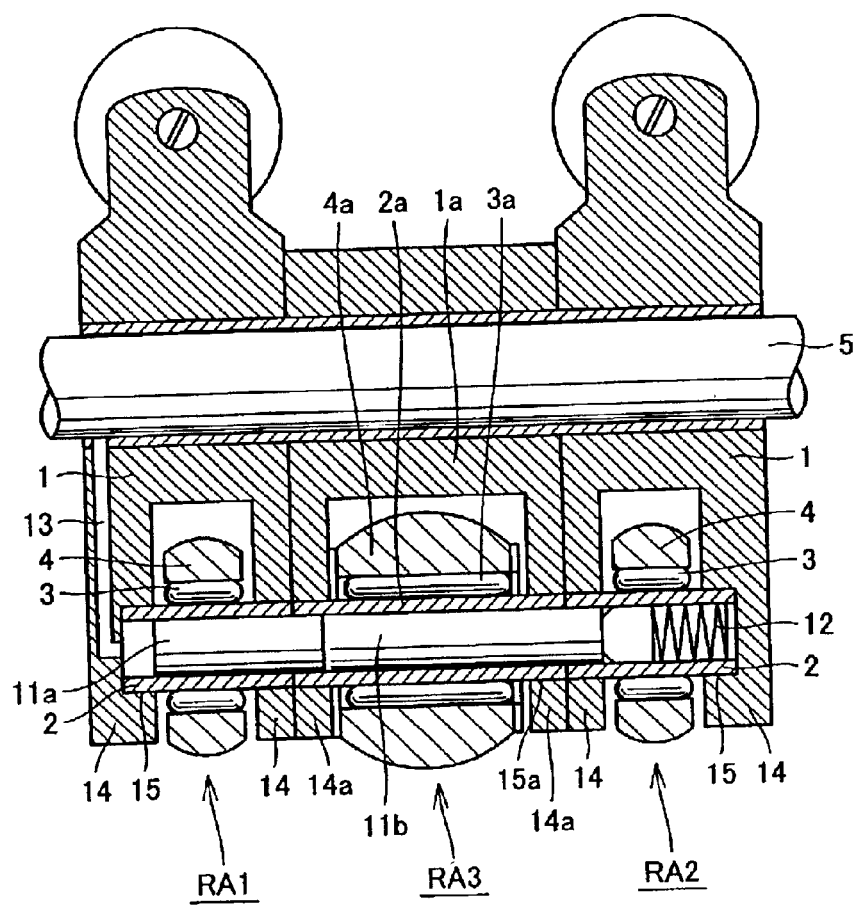
FIG. 3 is a schematic section view taken along the II—II line in FIG. 1, showing a structure when the cam follower with roller in FIG. 1 is used in a VTEC valve mechanism.

Referring to FIG. 3, the VTEC valve mechanism generally has driving locker arms RA1 and RA2 arranged at both sides, each of which is a cam follower with roller that is in contact with protruded rod 9 as shown in FIGS. 1 and 2. Another cam follower with roller that is separated from protruded rod 9 in FIGS. 1 and 2 is provided between the two driving locker arms RA1 and RA2 as a connecting locker arm RA3.

Connecting locker arm RA3 connect driving locker arm RA1 with driving locker arm RA2 on both sides to actuate them together at high engine revolutions, whereas it actuates driving locker arms RA1 and RA2 separately at low engine revolutions.

Each of roller shafts 2, 2a supporting each roller 4, 4a of these three locker arms RA1 to RA3 has a hollow shape, the hollow portion having two switching pins 11a, 11b arranged side-by-side therein. One end surface of switching pin 11a abuts one end surface of switching pin 11b, while the other end surface of switching pin 11b is biased by a spring 12 toward switching pin 11a. A hydraulic circuit 13 is provided on the other end surface of switching pin 11a so as to be connected to the inside of the hollow portion in roller shaft 2.

In such a structure, when hydraulic pressure on the other end surface of switching pin 11a is increased by hydraulic circuit 13, switching pins 11a, 11b move to the right-hand side in the figure against the biasing force of spring 12. Thus, locker arms RA1 to RA3 are connected to actuate together.

When, on the other hand, hydraulic pressure on the other end surface of switching pin 11a is reduced by hydraulic circuit 13, switching pins 11a, 11b move to the left-hand side in the figure by the biasing force of spring 12. Thus, the abutting surface of switching pins 11a and 11b is located at the boundary of locker arms RA1 and RA3, while the other end surface of switching pin 11b is located at the boundary of locker arms RA3 and RA2. This disconnects the three locker arms RA1 to RA3 from one another so that locker arms RA1 to RA3 actuate separately.

As such, three locker arms RA1 to RA3 can actuate together in a high-revolution range whereas they can actuate separately in a low-revolution range, allowing implementation of variable valve timing.

In the valve mechanism in the VTEC described above, at least one of each roller shaft 2, 2a and each needle roller 3, 3a in each of locker arms RA1 to RA3 is subjected to nitriding, whereby a nitride layer is formed on the surface. Moreover, at least one of each roller shaft 2, 2a and each needle roller 3, 3a has a surface hardness of at least HV 650 and an amount of retained austenite on the surface layer is at least 25% by volume and at most 50% by volume.

Figure 4:
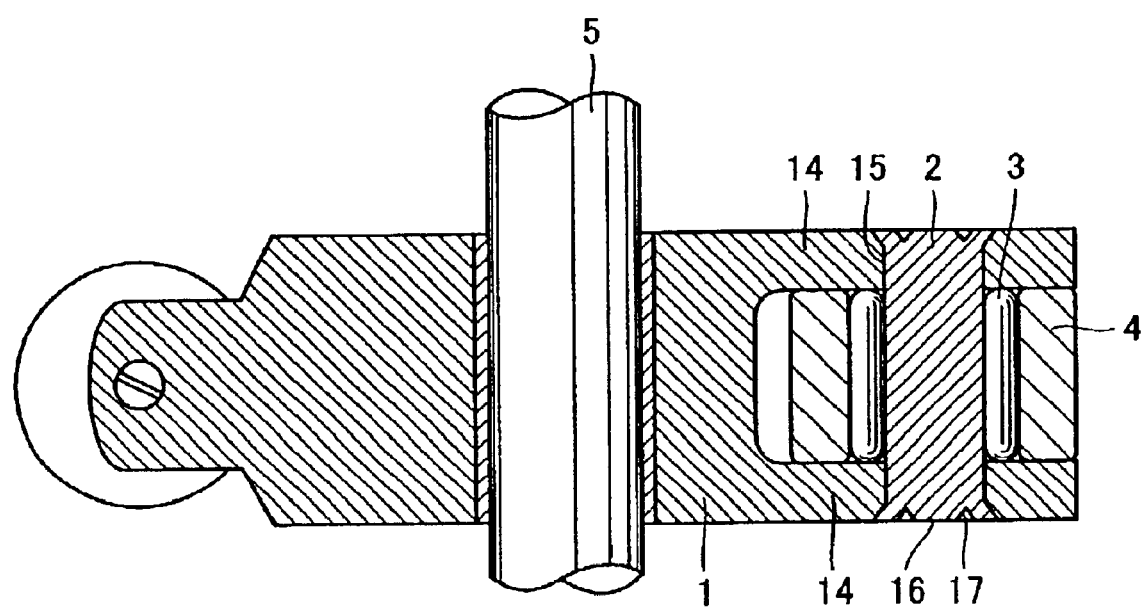
FIG. 4 is a schematic section view showing a structure when a roller shaft has a solid body and is caulked and fixed.

It is noted that roller shaft 2 is not limited to have a hollow shape, and may have a solid structure as shown in FIG. 4 with both ends thereof caulked and fixed to roller supporting portion 14. The caulking and fixing is performed by fitting roller shaft 2 into a shaft hole 15 provided at bifurcated roller supporting portion 14 and thereafter notching an end surface 16 of roller shaft 2 to form a caulking groove 17. By forming caulking groove 17, the edge portion of roller shaft 2 expands to bias the inner surface of shaft hole 15 by resilience, so that roller shaft 2 is firmly fixed to shaft hole 15.

Figure 5A:
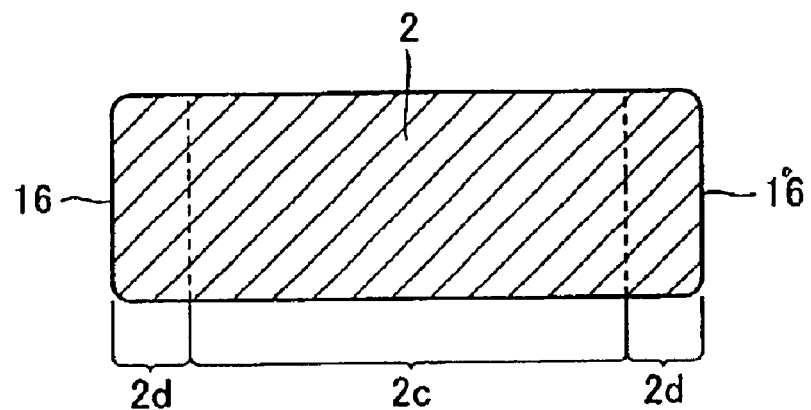
FIGS. 5A and 5B show a vertical section view and a hardness distribution line, respectively, of the roller shaft shown in FIG. 4.
Figure 5B:
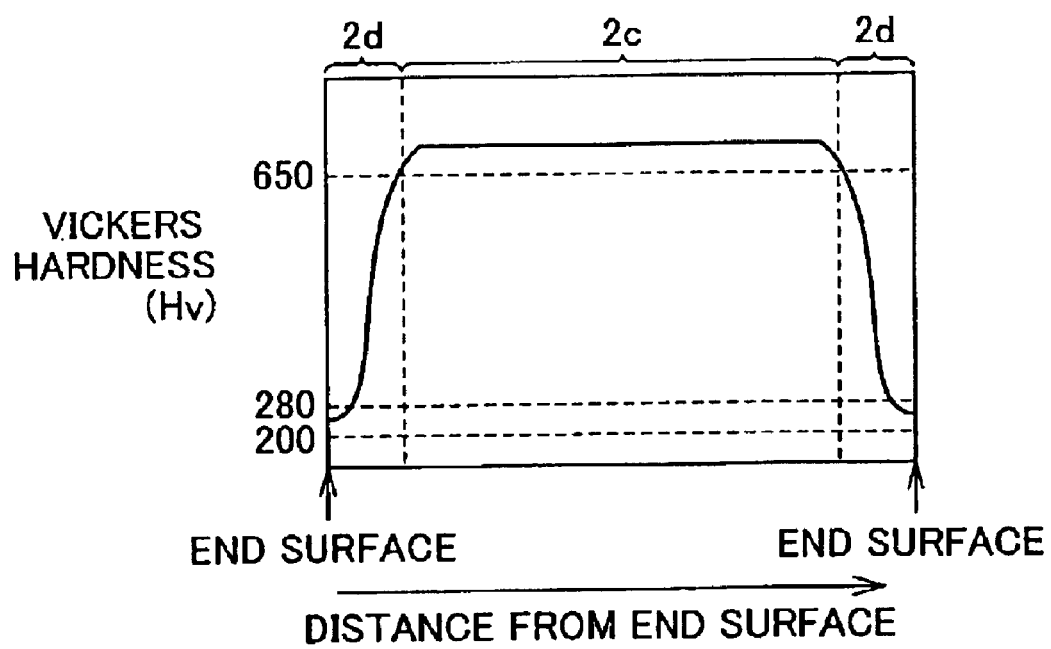

Referring to FIGS. 5A and 5B, a middle portion 2c of roller shaft 2 is hardened by high-frequency quenching, and an end portion 2d on either side is a not-quenched portion to which no quenching is provided. A part of or the entire outer circumferential surface of middle portion 2c is a portion to be a rolling contact surface on which needle roller 3 rolls.

Referring to FIG. 5B, in the hardness distribution on the surface of roller shaft 2, middle portion 2c has a Vickers hardness of at least HV 650, whereas a softened layer at each of both end portions 2d has a Vickers hardness of at least HV 200 and at most HV 280. Thus, middle portion 2c has a sufficient hardness as a rolling contact surface for needle roller 3, while softened portion 2d is sufficiently soft to be caulked.

It is noted that roller shaft 2 is made of carburized steel, and is subjected to carbonitriding followed by tempering.

An experimental example of the present invention will now be described below.

Figure 6:
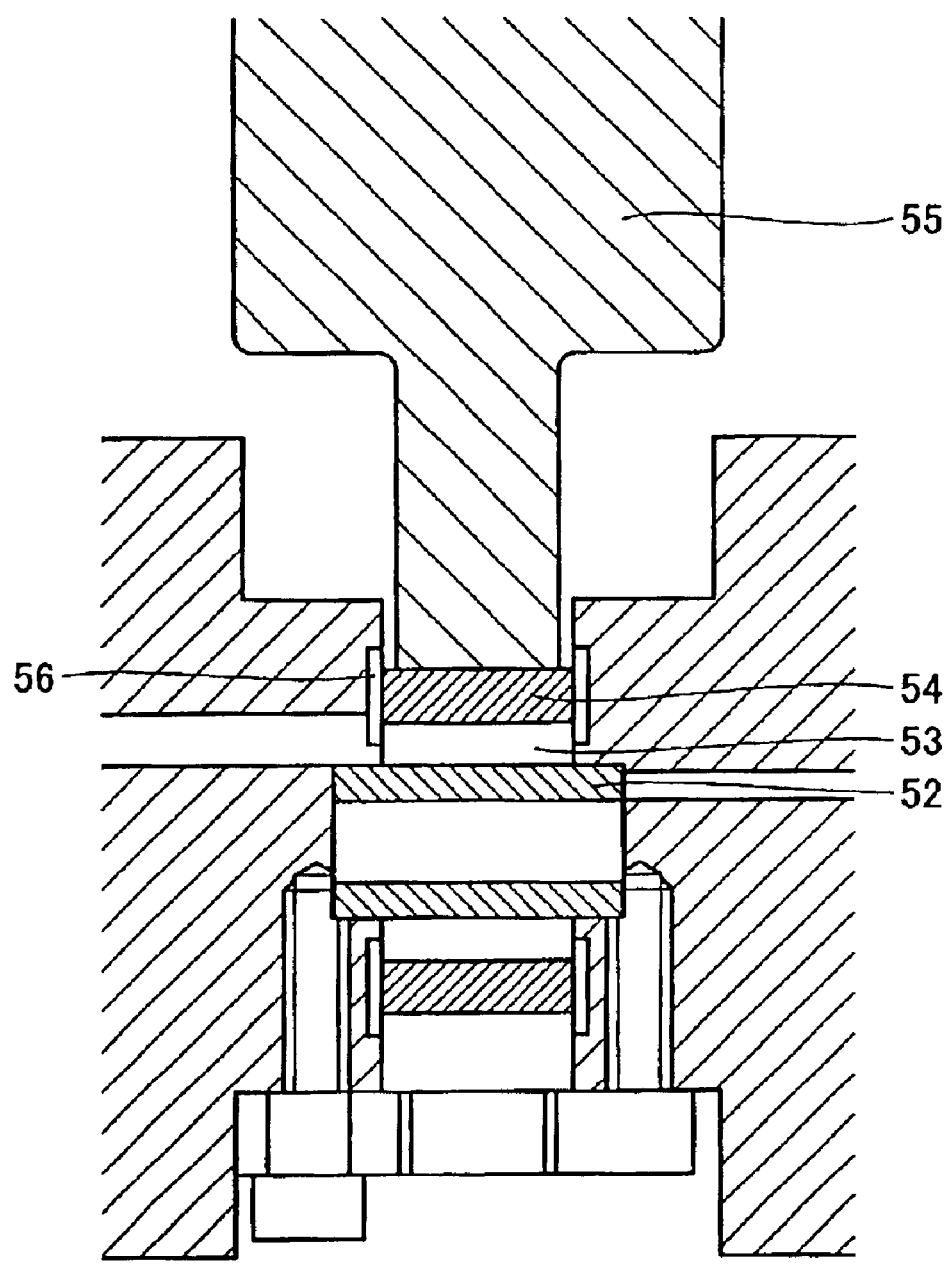
FIG. 6 is a section view schematically showing the structure of a test machine performing a life test.

A life test was performed for carburized shaft and carbonitrided shaft using a test machine shown in FIG. 6.

Referring to FIG. 6, a test machine configured to have a plurality of needle rollers 53 arranged to roll between a shaft 52 and an outer wheel 54 was used to perform the life test by rotating outer wheel 54 at a prescribed rate while a member 55 applies a radial load thereto.

The test condition is indicated in Table 1.

TABLE 1

| Test Condition | |
| --- | --- |
| Radial load | 4900 N |
| Number of rotations of outer wheel | 7000 r/min |
| Lubrication condition | Engine oil 10W–30 100° C. 150 mL/min |
| Calculated life | 124.8 h |

In the test machine described above, the test was performed for shaft 52 made of steel subjected to carburizing (carburized steel) and for shaft 52 made of steel subjected to carbonitriding. The results of the life test is indicated in Table 2.

TABLE 2

| | |
| --- | --- |
| Carburized shaft | 23.2 h, 35.2 h, 21.0 h, 28.9 h (all shafts damaged) |
| Carbonitrided shaft | 250 h, 480 h (no shafts damaged) |

As can be seen from the results in Table 2, the carburized shaft subjected to no nitriding process was damaged in approximately 20–35 hours, whereas the carbonitrided shaft subjected to nitriding had no damage after 250 hours or even after 480 hours.

Moreover, though the carburized shaft had the surface hardness of at least HV 650, the amount of retained austenite was 10% by volume. The carbonitrided shaft had a surface with a nitride layer formed thereon, and had the surface hardness of at least HV 650 and the amount of retained austenite of at least 25% by volume and at most 50% by volume.

This revealed that nitriding was required to obtain the amount of retained austenite of at least 25% by volume and at most 50% by volume, which would drastically improve life, though carburizing and quenching may be sufficient to improve only the surface hardness.

In the life test, comparison between the carburized shaft and the carbonitrided shaft was described. It should be noted, however, that a nitride layer is also formed on the surface when a shaft made of a material obtained by nitriding SUJ2 is used, and a surface hardness of at least HV 650 and an amount of retained austenite of at least 25% by volume and at most 50% by volume can be obtained, greatly increasing life. This shows that the shaft made of a bearing shaft subjected to nitriding also has an effect similar to the case with the carbonitrided shaft described above.

Though description was made with respect to shaft 52 in FIG. 6, needle roller 53 may similarly be made of carburized steel or bearing steel subjected to nitriding, to obtain a surface hardness of at least HV 650 and an amount of retained austenite of at least 25% by volume and at most 50% by volume, greatly improving life as in the case above.

According to the cam follower with roller of the present invention, a process that involves nitriding can be performed to increase a surface hardness to at least HV 650 and an amount of retained austenite to at least 25% by volume and at most 50% by volume. This can reduce abrasion occurring between a supporting shaft and a needle roller and can improve fatigue strength, allowing excellent durability and rolling fatigue life.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cam follower with roller, comprising a cam follower body having a roller supporting portion integrated into the cam follower body, a supporting shaft having both ends fixed to said roller supporting portion, and a roller rotatably supported on said supporting shaft with a plurality of needle rollers interposed, wherein said supporting shaft is formed by a hollow shaft, a switching pin is arranged in said hollow shaft so as to be movable in said hollow shaft, and at least one of said supporting shaft and said needle roller has a surface on which a nitride layer is formed, and has a surface hardness of at least HV 650 and an amount of retained austenite of at least 25% by volume and at most 50% by volume.

2. The cam follower with roller according to claim 1, wherein said supporting shaft is made of carburized steel and is subjected to carbonitriding followed by tempering.

3. The cam follower with roller according to claim 1, wherein said supporting shaft is made of bearing steel and is subjected to carbonitriding followed by tempering.

4. The cam follower with roller according to claim 1, wherein said supporting shaft is press-fit into said roller supporting portion.

* * * * *